United States Patent
Heo et al.

(10) Patent No.: US 11,454,770 B2
(45) Date of Patent: Sep. 27, 2022

(54) APPARATUS AND METHOD FOR ADJUSTING OPTICAL AXIS FOR OPTICAL WIRELESS COMMUNICATION IN FREE SPACE

(71) Applicant: ELECTRONICS AND TELECOMMUNICATIONS RESEARCH INSTITUTE, Daejeon (KR)

(72) Inventors: Young Soon Heo, Gwangju (KR); Sung Chang Kim, Gwangju (KR); Hyun Seo Kang, Gwangju (KR); Chan Il Yeo, Gwangju (KR); Ji Hyoung Ryu, Jeonju (KR); Si Woong Park, Gwangju (KR); Kye Eun Kim, Naju (KR); Keo Sik Kim, Gwangju (KR); Jeong Eun Kim, Gwangju (KR); Gi Hyeon Min, Gwangju (KR); Hyoung Jun Park, Gwangju (KR); Dong Hoon Son, Gwangju (KR); Mun Seob Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 16 days.

(21) Appl. No.: 17/002,391

(22) Filed: Aug. 25, 2020

(65) Prior Publication Data
US 2021/0063656 A1 Mar. 4, 2021

(30) Foreign Application Priority Data
Sep. 2, 2019 (KR) .......................... 10-2019-0108267

(51) Int. Cl.
G02B 6/42 (2006.01)
H04B 10/112 (2013.01)
(Continued)

(52) U.S. Cl.
CPC ......... *G02B 6/4226* (2013.01); *G02B 6/4206* (2013.01); *G02B 6/4225* (2013.01);
(Continued)

(58) Field of Classification Search
None
See application file for complete search history.

(56) References Cited

U.S. PATENT DOCUMENTS 4,730,931 A * 3/1988 Watson .................... D06H 3/08
250/559.37
6,493,490 B1 * 12/2002 Steiger .................. G02B 6/422
356/400
(Continued)

FOREIGN PATENT DOCUMENTS

| KR | 1020130093564 A | 8/2013 |
|---|---|---|
| KR | 101609850 B1 | 4/2016 |
| KR | 101817667 B1 | 1/2018 |

Primary Examiner — Omar R Rojas

(57) ABSTRACT

Provided are an apparatus and method for adjusting an optical axis. In the apparatus, an iris diaphragm and a quadrant photodiode (QPD) are used to align optical axes of an optical system of the apparatus so that optical transmission efficiency between an optical transmitter and an optical receiver can be increased. Since a hole of the iris diaphragm can be adjusted to be small, a beam larger than a light-receiving area of the QPD can be included in the light-receiving area, and optical axis alignment is facilitated accordingly. When the QPD and the iris diaphragm are applied to the apparatus, it is possible to simultaneously perform data transmission, tracking, and optical axis alignment. An optical fiber end surface and optical axes of lenses arranged in parallel are aligned in the apparatus so that
(Continued)

alignment between two terminals can be easy and reception efficiency can be increased.

15 Claims, 8 Drawing Sheets

(51) Int. Cl.
    *H04B 10/58*           (2013.01)
    *H04B 10/66*           (2013.01)

(52) U.S. Cl.
    CPC ........... *H04B 10/112* (2013.01); *H04B 10/58* (2013.01); *H04B 10/66* (2013.01)

(56) References Cited

U.S. PATENT DOCUMENTS

| | | |
|---|---|---|
| 9,541,714 B2 | 1/2017 | Lim et al. |
| 9,998,217 B2 | 6/2018 | Li et al. |
| 2014/0153928 A1 | 6/2014 | Yu et al. |
| 2014/0241731 A1 | 8/2014 | Peach et al. |

* cited by examiner

APPARATUS AND METHOD FOR ADJUSTING OPTICAL AXIS FOR OPTICAL WIRELESS COMMUNICATION IN FREE SPACE

CROSS-REFERENCE TO RELATED APPLICATION

This application claims priority to and the benefit of Korean Patent Application No. 10-2019-0108267, filed on Sep. 2, 2019, the disclosure of which is incorporated herein by reference in its entirety.

BACKGROUND

1. Field of the Invention

The present invention relates to an optical wireless communication including an optical axis alignment function for maximizing transmission and reception efficiency between an optical transmitter and an optical receiver during optical wireless communication in free space.

2. Discussion of Related Art

An existing optical wireless communication system in free space is used in various cases such as optical communication between buildings in which it is difficult to install optical cables, optical communication between unmanned mobile objects and ground stations, and underwater optical communications.

The optical wireless communication system which is used in various fields includes an optical transmitter, an optical receiver, and a plurality of optical parts such as a plurality of lenses arranged in parallel. During communication, light output from the optical transmitter is incident on the optical receiver in a line of sight (LoS) manner. To achieve LoS, optical alignment between the optical transmitter and the optical receiver is very important. Also, it is important for the optical receiver to receive a large amount of beams. The amount of beams is determined according to the size of a beam incident on the optical receiver.

LoS is not achieved if the location of a received output beam (an output beam at a final spot) varies according to transmission distance due to misaligned optical axes. Therefore, it is necessary to increase reception efficiency by adjusting inputs to the transmitter, the location of optical fibers, or the location of the receiver. To increase reception efficiency, it is necessary to align optical axes of all components (e.g., lenses, optical fibers, etc.) that light passes through. Then light beams propagate in parallel, and thus it is possible to increase reception efficiency regardless of transmission distance.

For long-distance optical wireless transmission, in the existing optical wireless communication system, optical axes of the plurality of lenses are aligned with one another. To this end, additional parallel light sources and equipment are used. Also, the lenses whose optical axes are aligned are installed in the optical wireless transmission system, and light output from the transmitter is made incident, through an optical fiber, on the lenses. In this case, the optical axis of light output from the optical fiber should be aligned with the optical axes of the lenses. Otherwise, particularly in bidirectional optical wireless communication employing a single optical system, a beam output from the lenses does not propagate to be parallel with the optical axis, and consequently, optical wireless communication efficiency becomes low and the optical transmitter and the optical receiver are not well aligned with each other.

SUMMARY OF THE INVENTION

The present invention is directed to providing an apparatus and method for adjusting optical axes of various optical components to implement a fixed-type optical wireless communication and a mobile-type optical wireless communication.

To smoothly perform long-distance optical wireless communication, optical axes of optical components should be collinear with each other. According to the present invention, without any optical axis alignment equipment, optical axes of an optical fiber end surface and a plurality of lenses are aligned with each other, using a quadrant photodiode (QPD) and an iris diaphragm in an optical wireless communication apparatus. The iris diaphragm can reduce the size of a beam which is greater than a light-receiving area of the QPD so that the beam may be incident on the light-receiving area. Accordingly, the iris diaphragm facilitates optical axis alignment.

Specifically, according to an aspect of the present invention, there is provided an apparatus for adjusting an optical axis for optical wireless communication in free space, the apparatus including a light output device configured to receive light from a transmitter and output the light, a QPD configured to receive the light output from the light output device, and an iris diaphragm placed between the light output device and the QPD and configured to adjust a beam size of the light received by the QPD. Here, the light output device may be an optical fiber connector serving as an optical fiber end surface.

According to another aspect of the present invention, there is provided a method of adjusting an optical axis using an optical axis adjusting apparatus configured as described above, the method including outputting light through the light output device, adjusting the iris diaphragm so that a beam size of the output light becomes smaller than a light-receiving area of the QPD, aligning optical axes of the light output device and the QPD so that the light is received at a center of the QPD, adding a lens between the light output device and the QPD and aligning an optical axis of the lens so that the light passing through the lens is received at the center of the QPD, and adjusting the iris diaphragm so that a beam size of the light passing through the lens equals the light-receiving area of the QPD.

The aligning of the optical axes of the light output device and the QPD so that the light is incident on the center of the QPD may include changing a location of the light output device in a Z direction in which the light output from the light output device travels or in a direction opposite to the Z direction and determining whether a location of the light received by the QPD is changed. Also, the changing of the location of the light output device to make the location of the light received by the QPD constant may include additionally changing the location of the light output device in at least one of X, Y, pan, and tilt directions in addition to the Z direction and the direction opposite to the Z direction.

Configurations and effects of the present invention will become clear from the following description of exemplary embodiments in conjunction with drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 1A and 1B illustrate beam propagation paths depending on whether optical axes are collinear with each other in an optical wireless communication apparatus according to an exemplary embodiment of the present invention.

DETAILED DESCRIPTION OF EXEMPLARY EMBODIMENTS

Figure 1A:
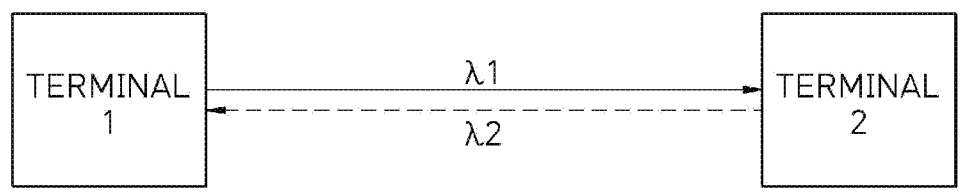

Advantages and features of the present invention and methods for achieving them will be made clear from exemplary embodiments described below in detail with reference to the accompanying drawings. However, the present invention is not limited to the exemplary embodiments disclosed below and can be embodied in various forms. The embodiments are provided so that this disclosure of the present invention will be thorough and complete and will fully convey the scope of the invention to those of ordinary skill in the art. The present invention is defined by the claims. Terminology used in this specification is for the purpose of describing the embodiments and is not intended to limit the present invention. In this specification, the singular forms include the plural forms as well unless the context clearly indicates otherwise. The terms "comprise" and/or "comprising" when used herein specify do not preclude the presence or addition of one or more elements, steps, operations, and/or devices other than stated elements, steps, operations, and/or devices.

Hereinafter, the exemplary embodiments of the present invention will be described in detail with reference to the accompanying drawings. In adding reference numerals to elements of each drawing, identical elements may have the same reference numeral as much as possible even if the elements are shown in different drawings. Further, in describing the present invention, the detailed description of a related known configuration or function will be omitted when it obscures the gist of the present invention.

Figure 1B:
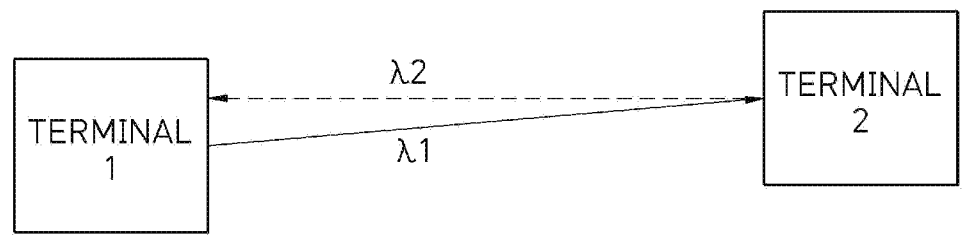

FIGS. 1A and 1B illustrate beam propagation paths depending on whether optical axes are collinear with each other in an optical wireless communication apparatus according to an exemplary embodiment of the present invention.

FIG. 1A shows that, when the optical axes of optical systems included in terminal 1 and terminal 2 are collinear with each other during optical wireless communication between terminal 1 and terminal 2 in free space, optical paths become straight so that optical alignment is readily achieved. On the contrary, when the optical axes are not collinear with each other as shown in FIG. 1B, light travels at a specific angle. When light travels a long distance at a specific angle, a beam path significantly deviates from an expected path. Although light (indicated by a solid line) traveling from terminal 1 to terminal 2 at the specific angle is incident on terminal 2, light (indicated by a broken line) traveling from terminal 2 to terminal 1 is incident on a location deviating from a receiver of terminal 1.

In the case of bidirectional transmission employing a single optical system, when optical axes are not collinear with each other, reception efficiency is remarkably reduced regardless of whether terminal 1 and terminal 2 are aligned with each other. Also, bidirectional optical alignment is very difficult.

Figure 2:
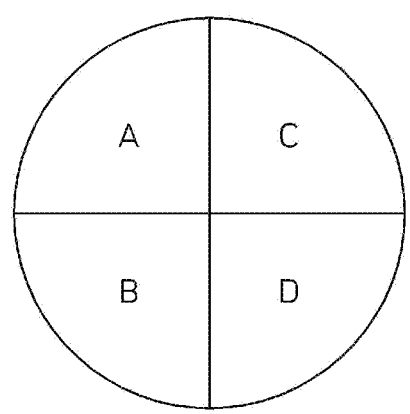
FIG. 2 is a schematic diagram of a quadrant photodiode (QPD) used for optical axis alignment.
Figure 3A:
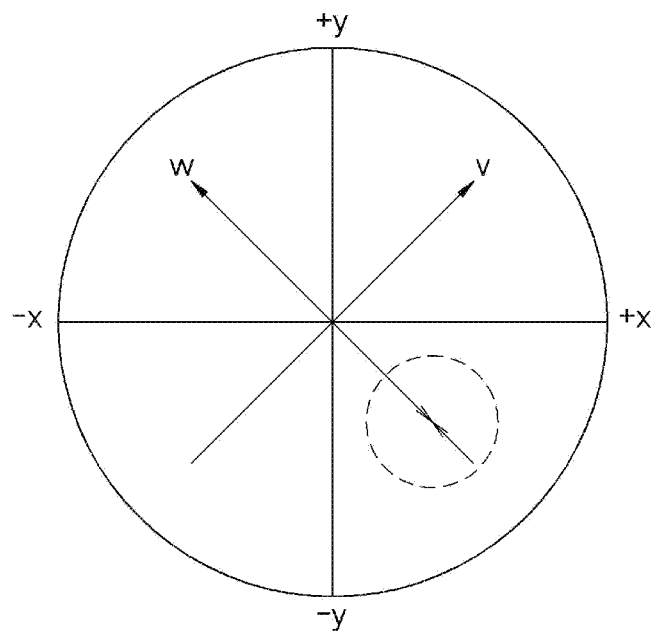
FIGS. 3A and 3B illustrate the location of a beam visualized for a check using a QPD.
Figure 3B:
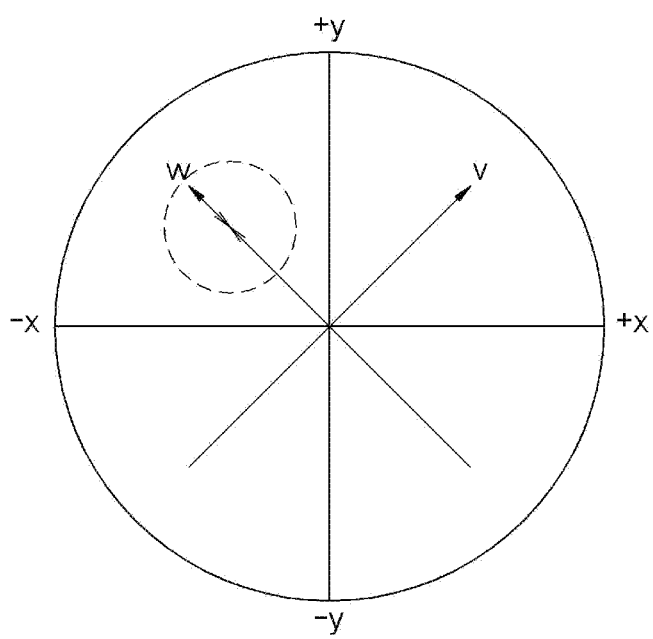

FIG. 2 is a schematic diagram of a quadrant photodiode (QPD) used for optical axis alignment in exemplary embodiments of the present invention. FIGS. 3A and 3B illustrate the location of a beam visualized for a check using a QPD.

The QPD 20 includes four photodiodes A, B, C, and D and may measure, as an electrical current value, the amount of light incident on each cell. In this case, the light may be visible light or infrared light. For the QPD 20, like other photodiodes, visible or infrared wavelength may be selected according to a wavelength of the light. By using the currents measured in the four cells of the QPD 20, a location on which a beam is incident and a total current may be calculated By using this principle, optical axes of an optical wireless communication system may be aligned. A pair of location coordinates (X,Y) of a beam is calculated using the current values measured in the four cells A, B, C, and D and the sum of the current values measured in the four cells, according to the following equation.

$$X = \frac{A+B-C-D}{Sum}, Y = \frac{A+C-B-D}{Sum}$$

The pair of location coordinates of a beam incident on the QPD 20 may be obtained by calculating X and Y values corresponding to coordinate values, using the above equation. The pair of beam location coordinates may be visualized as shown in FIGS. 3A and 3B by software programming. In this way, it is possible to intuitively observe a change in the beam location.

Figure 4A:
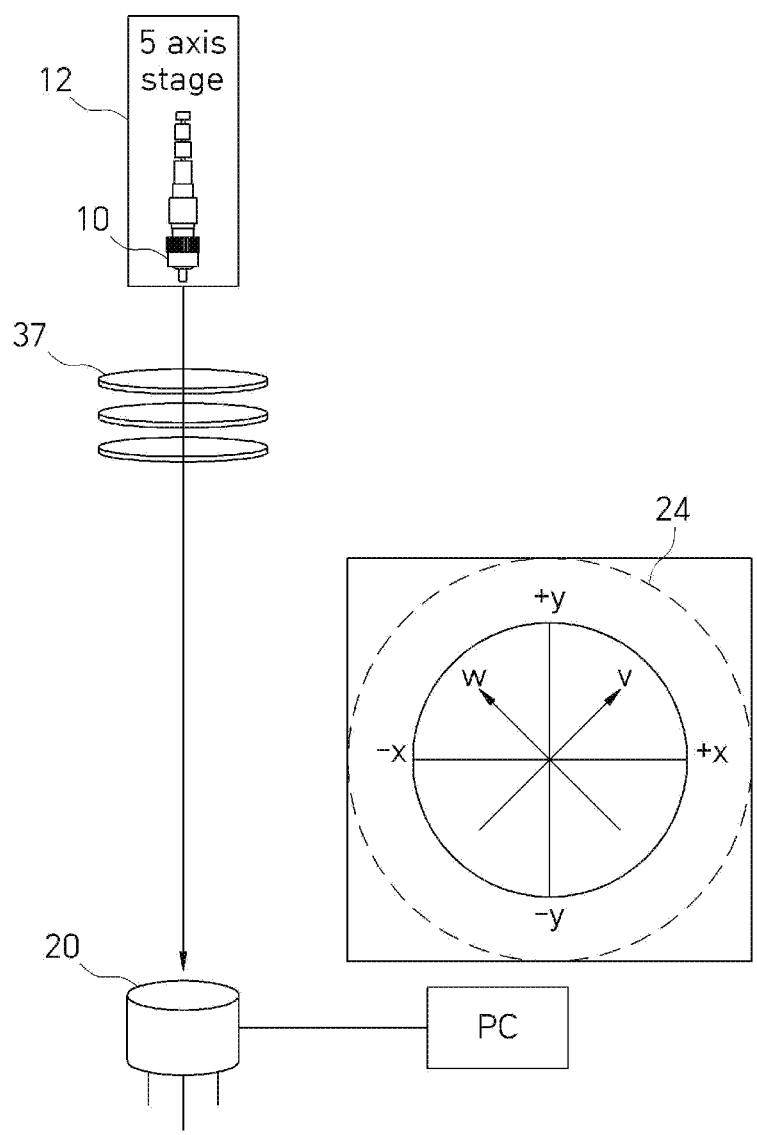
FIGS. 4A and 4B are conceptual diagrams of an optical axis alignment method employing a QPD and an iris diaphragm.
Figure 4B:
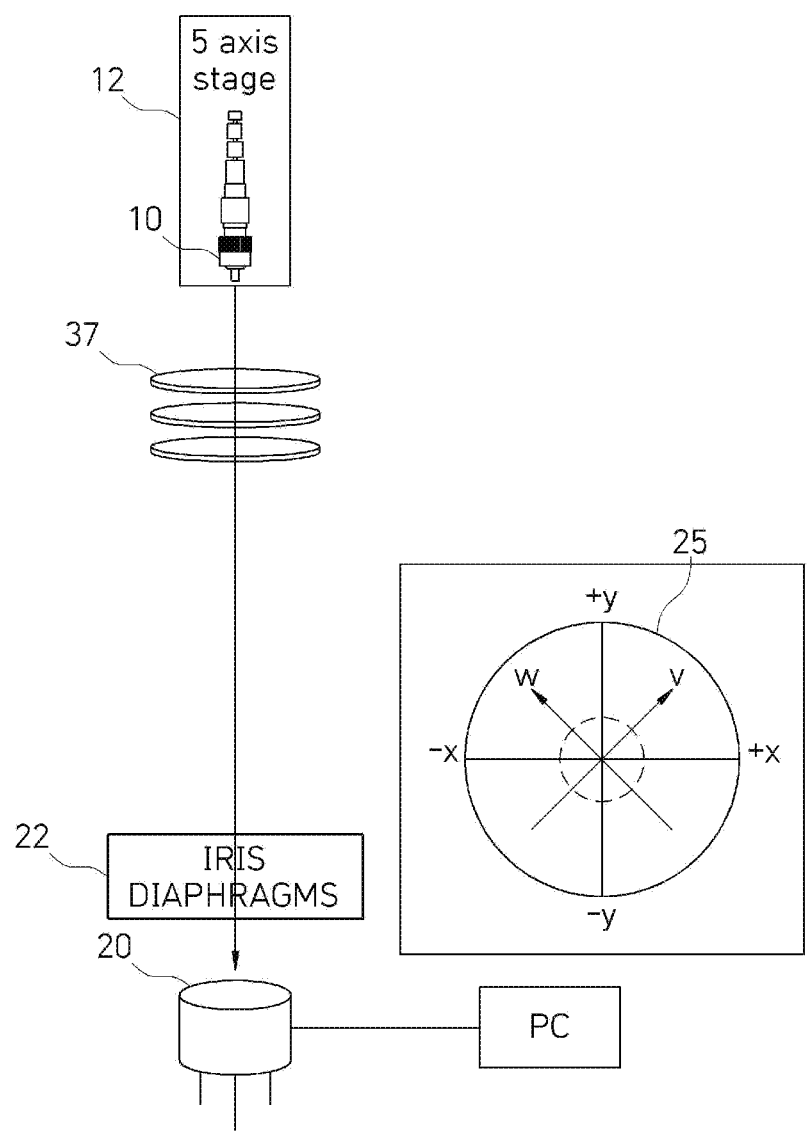
Figure 5A:
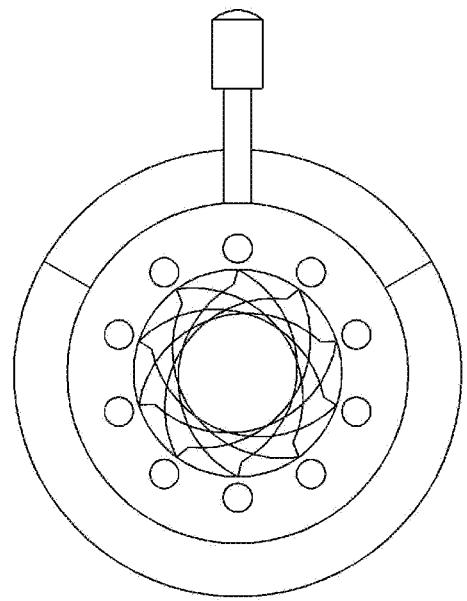
FIGS. 5A and 5B are schematic diagrams of an iris diaphragm used for optical axis alignment.
Figure 5B:
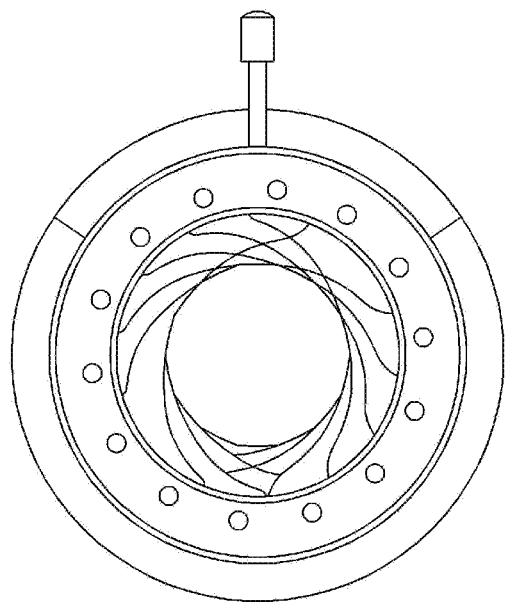

FIGS. 4A and 4B are conceptual diagrams of a method of aligning optical axes of optical systems with each other using a QPD and an iris diaphragm. FIG. 5 is a schematic diagram of an iris diaphragm used for optical axis alignment in exemplary embodiments of the present invention.

In a general long-distance optical wireless communication, to smoothly perform, a beam having a size of several to tens of centimeters is used. On the other hand, in this case a beam size 24 is much larger than a light-receiving area 25 of the QPD 20 (see FIG. 4A). The light-receiving area 25 of the QPD 20 is about several millimeters, and therefore, when the beam size 24 is larger than the light-receiving area 25 of QPD 20 as shown in FIG. 4A, it is not possible to observe a process in which the beam location is changed in the QPD 20 even if optical axes are misaligned.

To solve this problem, an iris diaphragm 22 of FIG. 5 is used. The iris diaphragm 22 is used to reduce the beam size 24 so that the beam may enter the light-receiving area 25 of the QPD 20 as shown in FIG. 4B. Then, it is possible to easily check a beam travelling path. Since a hole size of the iris diaphragm 22 is adjustable, the beam size 24 may be adjusted according to the size of the light-receiving area 25 of the QPD 20 even when using it for a large-aperture optical system.

In order to align optical axes of lenses 37 as shown in FIG. 4B, an optical fiber connector 10 is used to serve as a light output device (an optical fiber end surface) which receives light transmitted by a transmitter through an optical fiber and outputs the received light.

For optical axis alignment according to the present invention, first, a beam is emitted to the QPD 20 through the iris diaphragm 22 without the lenses 37. In this case, the hole of the iris diaphragm 22 is adjusted to be small so that the beam may enter the light-receiving area of the QPD 20.

The optical fiber connector 10 is fixed to a 5-axis (X, Y, Z, pan, and tilt) stage 12, which is moved in a direction in which light travels, that is, Z or –Z direction and is controlled to move forward or rearward. After transmitting the beam over a long distance, in order to determine whether the optical axes are collinear, it is necessary to check the location of the beam while moving the QPD 20 from the optical fiber connector 10 to the Z direction. However, there is a limit to perform such a task in a general laboratory environment. Therefore, the optical fiber connector 10 rather than the QPD 20 is moved in the Z or –Z direction. Then, it is possible to efficiently verify whether the optical axes are uniformly maintained by determining whether the beam location is changed.

If the beam location may be the same as that shown in FIG. 3A when the optical fiber connector 10 is moved in a direction approaching the QPD 20 (e.g., in Z direction) and if the beam location may be the same as that shown in FIG. 3B when the optical fiber connector 10 is moved in a direction away from the QPD 20 (e.g., in –Z direction), the optical axis of the optical fiber connector 10 is misaligned. To fix the optical axis of the optical fiber connector 10, the pan and the tilt of the 5-axis stage 12 are adjusted so that the location of the beam incident on the QPD 20 may not be moved even when the optical fiber connector 10 is moved forward or rearward.

After the optical axis of the optical fiber connector 10 is fixed, one lens 37 is placed in front of the optical fiber connector 10. Regardless of whether there is one lens or no lens, the location of the beam incident on the QPD 20 should be constant. If the beam location becomes different, the pan and the tilt of an adjustment part (not shown) for adjusting the lenses 37 are adjusted so that the beam location may be the same as in the case in which there is no lens. Then, a change in the location of the beam incident on the QPD 20 is observed while the optical fiber connector 10 is moved in the Z direction, and the lens 37 is fixed at a point at which the optical axes are collinear. The optical axes may be aligned by sequentially mounting all the lenses 37 one by one as described above.

As described above, according to the present invention, whether or not the optical axes are collinear is not determined by transmitting light over a long distance. Rather, it is possible to determine whether the optical axes are collinear by moving the optical fiber connector 10 forward or rearward at a short distance. When optical axes are not collinear with each other, optical axis alignment may be performed.

Figure 6A:
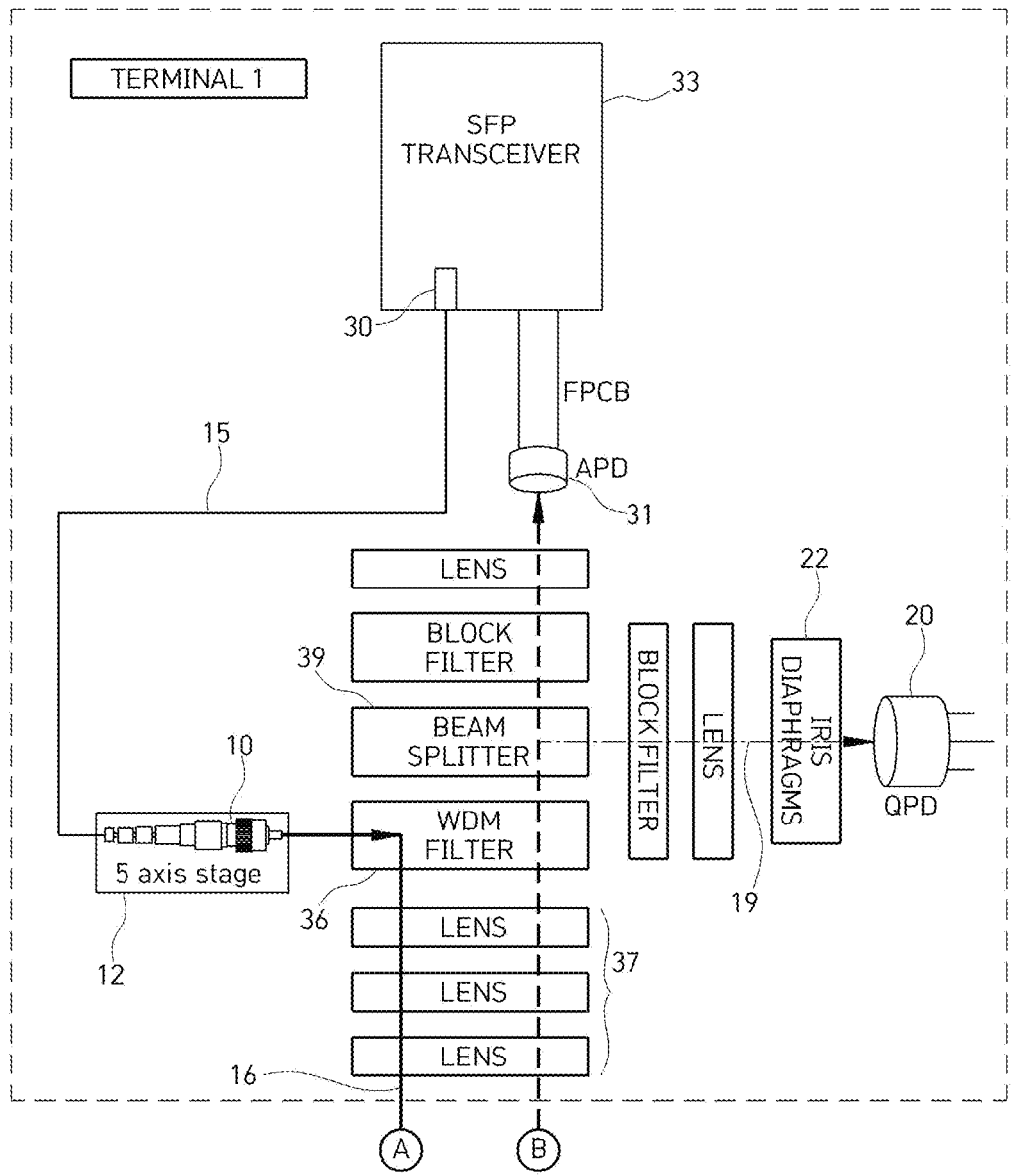
FIGS. 6A and 6B illustrate an optical wireless transmission apparatus to which an optical axis alignment method according to an exemplary embodiment of the present invention is applied.
Figure 6B:
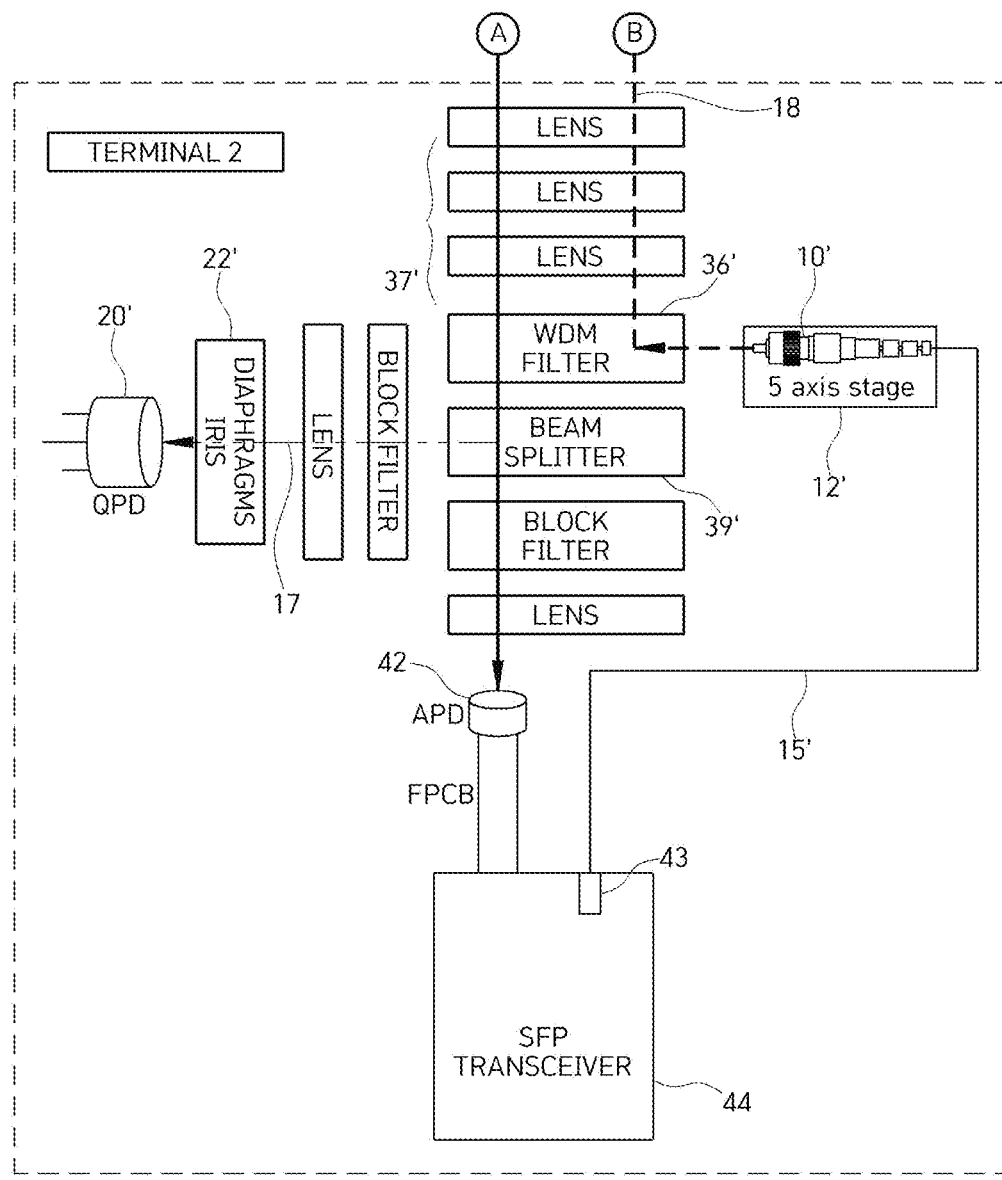

FIGS. 6A and 6B collectively illustrate an optical wireless transmission apparatus which is capable of bidirectional communication through one optical path in free space and to which an optical axis alignment method according to an exemplary embodiment of the present invention is applied.

Light used in terminal 1 and terminal 2 have different wavelengths. To separate the two wavelengths, a wavelength division multiplexing (WDM) filter is used.

First, light is output from a transmitter 30 of a small form-factor pluggable (SFP) transceiver 33 of terminal 1 and passes through an optical fiber 15. The light passing through the optical fiber 15 is transmitted through the optical fiber connector 10 mounted on the 5-axis stage 12. The light transmitted through the optical fiber connector 10 is reflected by a WDM filter 36 and output to free space through the plurality of lenses. The light traveling in free space is incident on a receiver 42 of an SFP transceiver 44 through lenses 37' of terminal 2.

To perform bidirectional optical wireless communication between terminal 1 and terminal 2 configured as described above, alignment between the two terminals is necessary. Also, tracking is required to maintain the line of sight (LoS) between the two terminals, and the QPD 20 is used for the tracking (which will be described in detail below).

A first transmission light 16, which is reflected by the WDM filter 36 of terminal 1, passes through the lenses 37, travels in free space, and passes through the lenses 37' of terminal 2, is split at a certain ratio by a beam splitter 39' before it is incident on the receiver 42 of the SFP transceiver 44, so that a first split light 17 is obtained. In this case, an iris diaphragm 22' and a QPD 20' are used to align the optical axes with respect to the first split light 17.

Likewise, when terminal 2 transmits light to terminal 1, a second transmission light 18, which is reflected by a WDM filter 36' of terminal 2, passes through the lenses 37', travels in free space and passes through the lenses 37 of terminal 1, is a certain ratio changed in optical path by a beam splitter 39 before being incident on a receiver 31 of the SFP transceiver 33, so that a second split light 19 is obtained. Like the first split light 17, the iris diaphragm 22 and the QPD 20 are used to align the optical axes with respect to the second split light 19.

As described above, in the optical wireless communication system of FIGS. 6A and 6B, it is possible to perform optical axis alignment as well as tracking between two terminals using the QPDs 20 and 20'. Also, the iris diaphragms 22, 22' are placed in front of the QPDs 20, 20' in the optical wireless communication system. In the case of optical axis alignment, the hole size of the QPD 20, 20' is reduced so that a beam may enter the light-receiving area of the QPD 20, 20'. In the case of tracking, the hole of the iris diaphragm 22, 22' may be controlled to be open wide.

An optical Ethernet card may be used for data transmission between two terminals so that high-density data, such as a video or a picture, may be wirelessly transmitted through light. Therefore, in FIGS. 6A and 6B, the SFP transceivers 33 and 44 may be applied to the optical Ethernet card to implement an optical transmitter and optical receiver. Optical fiber cables are put in transmitter optical subassembly (TOSA) modules included in the SFP transceivers 33 and 44, and the TOSA modules are used as the transmitters 30 and 43. As the receivers 31 and 42, advanced photodiode (APD) connected to flexible printed circuit board (FPCB) are soldered on SFP board and then placed in front of the last lens to receive beams output from the last lens. In FIGS. 6A and 6B, the beam splitters 39 and 39' are used to separate light for data transmission and light for tracking, and block filters are used to block light having a wavelength other than a communication wavelength.

Now, light output from the transmitter 30 of the SFP transceiver 33 is described in detail. Here, only light incident from terminal 1 onto terminal 2 will be described. However, the description for light incident from terminal 2 onto terminal 1 is identical to the former.

Light used in the optical wireless communication system is classified as light for data communication and light for tracking. According to a related art, two types of light are used for data communication and tracking. However, according to the present invention, one type of light may be used for data communication and tracking. To this end, according to the exemplary embodiment of the present invention, the beam splitter 39' is used.

To help understanding, 70% to 80% of light output from the transmitter 30 of the SFP transceiver 33 (the output light passes through the beam splitter 39' and is incident on the APD 42) is used for data communication. The remaining 20% to 30% (reflected by the beam splitter 39' and incident on the QPD 20') is used for tracking.

As described above, the QPD 20' is used for alignment between the two terminals. When light (which corresponds to the light used for tracking at a ratio of 20% to 30%) is incident on the QPD 20', currents flowing in the four quadrants may be obtained (current data is converted into voltage values by a driver board). In this way, a pair of coordinates is derived using the afore-mentioned equation. When the two terminals are well aligned with each other, X,Y coordinates are 0,0. When the two terminals are not aligned with each other, X and Y coordinate values are saturated (a saturation value varies depending on a setting of the driver board).

Here, tracking is a technology for checking whether two terminals are well aligned with each other (which means that the pair of coordinates is (0,0)) by monitoring the pair of coordinates in the QPD 20' in real time and moving the two terminals in real time for alignment. For performing the tracking, a high-precision gimbal may be necessary. When it is checked through tracking that the pair of coordinates in the QPD 20' is (0,0) (i.e., the two terminals are well aligned with each other), it may be determined that light for data communication is well incident on the APD 42 (i.e., a receiver of the SFP transceiver 44). In other words, when it is determined whether 20% to 30% of one type of light used for tracking is well aligned, it is also possible to know that the remaining 70% to 80% of light is well incident on the APD 42.

Figure 7:
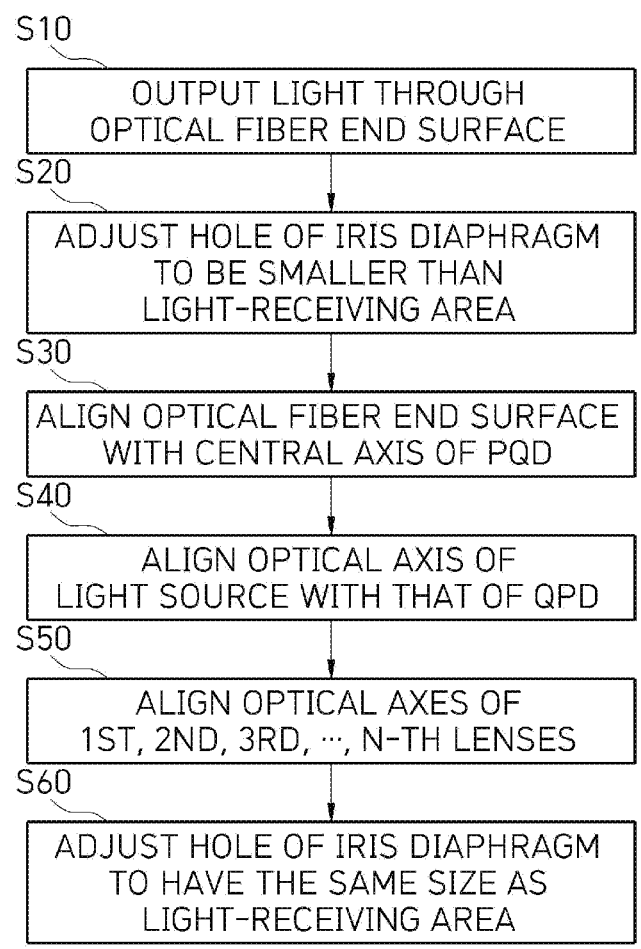
FIG. 7 is a flowchart of the optical axis alignment method according to the exemplary embodiment of the present invention.

FIG. 7 is a flowchart of the optical axis alignment method according to the exemplary embodiment of the present invention.

Light is output through an optical fiber end surface (e.g., the above-described light output device or optical fiber connector) (S10). At this time, no lens is mounted.

The hole of the iris diaphragm 22 is adjusted so that the beam size 24 may become smaller than the light-receiving area 25 of the QPD 20 (S20). This is intended to make the beam size 24 smaller than the light-receiving area 25 of the QPD 20 so that the optical axes may be readily adjusted.

The optical fiber end surface and the central axis of the QPD 20 are aligned with each other (S30), and optical axes of the light and the QPD 20 are aligned (S40). As described above, the optical fiber end surface is moved in the Z direction, and the location of light received by the QPD 20 is accordingly determined so that whether the optical axes are collinear is determined. A 5-axis stage is used to align the optical axes.

First, second, third, . . . , and $n^{th}$ lenses are sequentially mounted, and the optical axes thereof are aligned (S50). As described above, the pan and the tilt of the lens adjustment part are adjusted so that the beam location may be the same as in the case in which there is no lens.

The hole of the iris diaphragm 22 is adjusted again so that the beam size 24 may have the same size as the light-receiving area 25 of the QPD 20 (S60). This is intended to perform tracking using the QPD 20 and light after adjusting the optical axes.

According to the exemplary embodiments of the present invention, a QPD and an iris diaphragm are used. Therefore, in long-distance optical wireless communication employing a single optical system, alignment between an optical transmitter and an optical receiver is facilitated, and bidirectional transmission and reception efficiency can be maximized. Also, it is possible to check that optical axes are not changed when light travels a long distance by adjusting the location of an optical fiber end surface, and it is possible to easily perform optical axis alignment. Further, since it is possible to align optical axes of a plurality of lenses arranged in parallel, additional lens optical axis alignment equipment is not required.

Moreover, it is possible to simultaneously perform data transmission, tracking, and optical axis alignment by applying a QPD and an iris diaphragm to an optical wireless communication apparatus. The optical axis of an optical fiber end surface and the optical axes of lenses arranged in parallel are aligned in the optical wireless communication apparatus so that alignment between two terminals can be easy and reception efficiency can be increased.

Although the present invention has been described in detail above with reference to the exemplary embodiments, those of ordinary skill in the art should be able to understand that various modifications and alterations can be made without departing from the technical spirit or essential features of the present invention. Therefore, it should be understood that the disclosed embodiments are not limiting but illustrative in all aspects. The scope of the present invention is defined not by the above description but by the following claims, and it should be understood that all changes or modifications derived from the scope and equivalents of the claims fall within the scope of the present invention.

What is claimed is:

1. An apparatus for adjusting an optical axis for a first terminal and a second terminal which perform optical wireless communication in free space, the first terminal comprising:
a first light output device configured to output a first light, the second terminal comprising:
a second light output device configured to output a second light,
the first terminal further comprising:
a first iris diaphragm configured to adjust a beam size of the second light from the second light output device of the second terminal; and
a first quadrant photodiode (QPD) configured to receive the second light whose beam size has been adjusted by the first iris diaphragm, and
the second terminal further comprising:
a second iris diaphragm configured to adjust a beam size of the first light from the first light output device of the first terminal; and
a second QPD configured to receive the first light whose beam size has been adjusted by the second iris diaphragm,
wherein the first iris diaphragm adjusts the beam size of the second light to be smaller than a light-receiving area of the first QPD, wherein the second iris diaphragm adjusts the beam size of the first light to be smaller than a light-receiving area of the second QPD, and wherein the first light output device comprises a movable optical fiber connector.

2. The apparatus of claim 1, wherein the first light output device and the second light output device are optical fiber connectors.

3. The apparatus of claim 1, wherein the first terminal further comprises:
a first stage configured to change a location of the first light output device in a Z direction in which the first light output from the first light output device travels or a direction opposite to the Z direction, and
wherein the second terminal further comprises:
a second stage configured to change a location of the second light output device in a Z direction in which the second light output from the second light output device travels or a direction opposite to the Z direction.

4. The apparatus of claim 3,
wherein the first stage is a first multi-axis stage which changes the location of the first light output device in at least one of X, Y, pan, and tilt directions in addition to the Z direction on the basis of a location at which the first light output from the first light output device is received by the second QPD, and
wherein the second stage is a second multi-axis stage which changes the location of the second light output device in at least one of X, Y, pan, and tilt directions in addition to the Z direction on the basis of a location at which the second light output from the second light output device is received by the first QPD.

5. The apparatus of claim 1, comprising:
a first device configured to detect a location of the first light received by the second QPD and visualize coordinates of the location of the first light and
a second device configured to detect a location of the second light received by the first QPD and visualize coordinates of the location of the second light.

6. The apparatus of claim 1, wherein the first terminal further comprises:
a first lens which passes the first light to the free space and receives the second light from the second terminal, and
wherein the second terminal further comprises:
a second lens which passes the second light to the free space and receives the first light from the first terminal.

7. The apparatus of claim 1, wherein the first terminal further comprises:
a first optical path changer configured to change a path of the second light output from the second light output device toward the first QPD, and
wherein the second terminal further comprises:
a second optical path changer configured to change a path of the first light output from the first light output device toward the second QPD.

8. The apparatus of claim 1, wherein the first terminal further comprises:
a first beam splitter configured to split the first light output from the first light output device, and
wherein the second terminal further comprises:
a second beam splitter configured to split the second light output from the second light output device.

9. A method of adjusting an optical axis for a first terminal and a second terminal which perform optical wireless communication in free space, the method comprising:
outputting a first light from a first optical fiber end surface of the first terminal;
outputting a second light from a second optical fiber end surface of the second terminal;
receiving the second light output from the second optical fiber end surface by a first quadrant photodiode (QPD) of the first terminal;
receiving the first light output from the first optical fiber end surface by a second QPD of the second terminal;
adjusting a beam size of the second light received by the first QPD with a first iris diaphragm of the first terminal; and
adjusting a beam size of the first light received by the second QPD with a second iris diaphragm of the second terminal,
wherein the first iris diaphragm adjusts the beam size of the second light to be smaller than a light-receiving area of the first QPD,
wherein the second iris diaphragm adjusts the beam size of the first light to be smaller than a light-receiving area of the second QPD, and
wherein the first optical fiber end surface is comprised in a movable connector.

10. The method of claim 9, further comprising:
changing a location of the first optical fiber end surface in a Z direction in which the first light output from the first optical fiber end surface travels or a direction opposite to the Z direction: and
changing a location of the second optical fiber end surface in a Z direction in which the second light output from the second optical fiber end surface travels or a direction opposite to the Z direction.

11. The method of claim 10, wherein the changing of the location of the first optical fiber end surface comprises:
changing the location of the first optical fiber end surface in at least one of X, Y, pan, and tilt directions in addition to the Z direction and the direction opposite to the Z direction, and
wherein the changing of the location of the second optical fiber end surface comprises:
changing the location of the second optical fiber end surface in at least one of X, Y, pan, and tilt directions in addition to the Z direction and the direction opposite to the Z direction.

12. The method of claim 9, further comprising:
detecting a location of the second light received by the first QPD and visualizing coordinates of the location of the second light and
detecting a location of the first light received by the second QPD and visualizing coordinates of the location of the first light.

13. The method of claim 9, further comprising:
adding a first lens between the first optical fiber end surface and the second QPD and adjusting at least one of pan and tilt of the first lens; and
adding a second lens between the second optical fiber end surface and the first QPD and adjusting at least one of pan and tilt of the second lens.

14. The method of claim 9, further comprising:
before the first light output from the first optical fiber end surface is received by the second QPD, changing a path of the first light; and
before the second light output from the second optical fiber end surface is received by the first QPD, changing a path of the second light.

15. The method of claim 9, further comprising:
before the first light output from the first optical fiber end surface is received by the second QPD, splitting the first light; and before the second light output from the second optical fiber end surface is received by the first QPD, splitting the second light.

\* \* \* \* \*